United States Patent

Hymel

[11] Patent Number: 6,125,262
[45] Date of Patent: Sep. 26, 2000

[54] SELECTIVE CALL RADIO FOR SELECTIVELY DECODING PRIORITIZED MESSAGES AND METHOD THEREFOR

[75] Inventor: James Allen Hymel, Lake Worth, Fla.

[73] Assignee: Motorola, Schaumburg, Ill.

[21] Appl. No.: 09/138,935

[22] Filed: Aug. 24, 1998

[51] Int. Cl.[7] .................................................. H04Q 7/14
[52] U.S. Cl. .................. 455/38.3; 455/551; 455/574; 455/226.3; 455/343; 340/825.44
[58] Field of Search ................................. 455/461, 466, 455/512, 67.3, 31.2, 32.1, 38.1, 38.3, 343, 551, 552, 553, 404, 432, 565, 574, 254, 226.3, 186.1; 340/825.44, 311.1

[56] References Cited

U.S. PATENT DOCUMENTS

| | | |
|---|---|---|
| 4,755,816 | 7/1988 | DeLuca et al. . |
| 5,428,666 | 6/1995 | Fyfe et al. ............................. 455/551 |
| 5,442,806 | 8/1995 | Barber et al. ........................... 455/551 |
| 5,448,622 | 9/1995 | Huttunen ................................ 455/551 |
| 5,497,507 | 3/1996 | Komaki ................................... 455/343 |
| 5,526,398 | 6/1996 | Okada et al. ........................... 455/38.1 |
| 5,842,141 | 11/1998 | Vaihoja et al. ........................ 455/574 |

Primary Examiner—Reinhard J. Eisenzopf
Assistant Examiner—Lester G. Kincaid
Attorney, Agent, or Firm—Pablo Meles

[57] ABSTRACT

A SCR (122) is assigned to a plurality of addresses, and includes a receiver (304) and a processor (308) coupled thereto. The processor is adapted to assign a priority level to each of the plurality of addresses assigned to the SCR. At or near a predetermined time when a message with a corresponding address is to be received in a radio signal, the processor determines a likelihood that the SCR can decode the message according to a predetermined expectation (502). When the likelihood of decoding the message is below the predetermined expectation, the processor disables at least one address assigned to the SCR having a priority level below a predetermined priority level (504, 508). The processor then enables the receiver to receive the radio signal, and disregard one or more messages in the radio signal having an address matching the at least one address that was disabled (510).

9 Claims, 3 Drawing Sheets

SELECTIVE CALL RADIO FOR SELECTIVELY DECODING PRIORITIZED MESSAGES AND METHOD THEREFOR

FIELD OF THE INVENTION

This invention relates in general to radio communication systems, and particularly, to a selective call radio for selectively decoding prioritized messages and method therefor.

BACKGROUND OF THE INVENTION

Radio communication systems that transmit selective call messages to SCRs (selective call radios), such as cellular phones and pagers, have been in use for some time now. The type of selective call messages transmitted to SCRs range anywhere from personal messaging (e.g., pages, telephony) to information services (e.g., advertising, news, weather, internet data, etc.).

Based on such a wide range of messaging services, it has become common place for SCRs to receive a large volume of messages on a daily basis. It is expected that with the higher volume of message communication, portable battery-operated SCRs will have a shorter battery-life cycle. More importantly, it is expected that SCRs that have nearly reached the end of a battery-life cycle will be unable to receive long messages as a result of an SCR's battery running out of energy before the entire message has been received. Under this scenario, an SCR will be unable to receive completed messages. A similar situation arises for SCRs that receive a high volume of messages under environmental conditions where the BER (bit error rate) is high. An SCR under these conditions will be unable to receive long messages independent of the state of the battery.

Either of these modes of operation of a SCR create a perception to an end user that the SCR has malfunctioned. This perception gives rise to a certain degree of dissatisfaction in the services provided by a service provider of the radio communication system. Accordingly, a need exists for a SCR that substantially eliminates the foregoing disadvantages described in the prior art.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

DESCRIPTION OF THE PREFERRED EMBODIMENT

Figure 1:
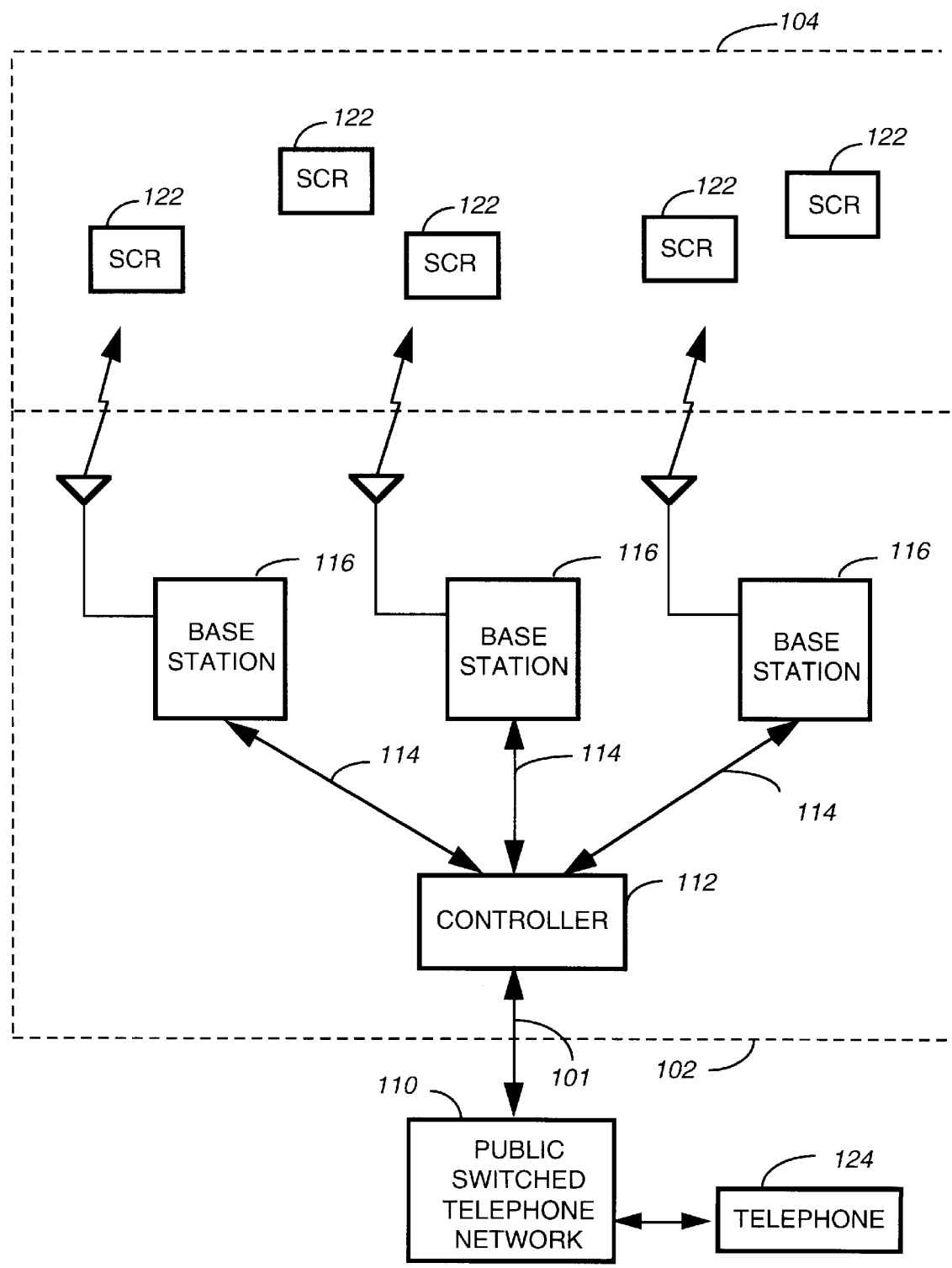
FIG. 1 is an electrical block diagram of a communication system utilized by the present invention.

FIG. 1 is an electrical block diagram of a communication system 100 according to the present invention. The communication system 100 comprises a radio communication system 102 and a portable portion 104 comprising a plurality of SCRs 122 (selective call radios). The radio communication system 102 includes a controller 112 for controlling operation of a plurality of base stations 116 by way of conventional communication links 114, such as, e.g., microwave links. The plurality of SCRs 122 in the portable portion 104 are used for receiving selective call messages from the base stations 116 under the control of the controller 112.

The controller 112 receives messages from callers utilizing a conventional telephone 124 for communicating with a conventional PSTN (public switch telephone network) 110. The PSTN 110 relays messages to the controller 112 through a conventional telephone line 101 coupled to the controller 112. Upon receiving messages from the PSTN 110, the controller 112 processes the messages, and delivers them to the base stations 116 for transmission to designated SCRs 122. In addition to transmitting selective call messages, the controller 112 is programmed to either selectively transmit or broadcast advertisements to the plurality of SCRs 122.

Figure 2:
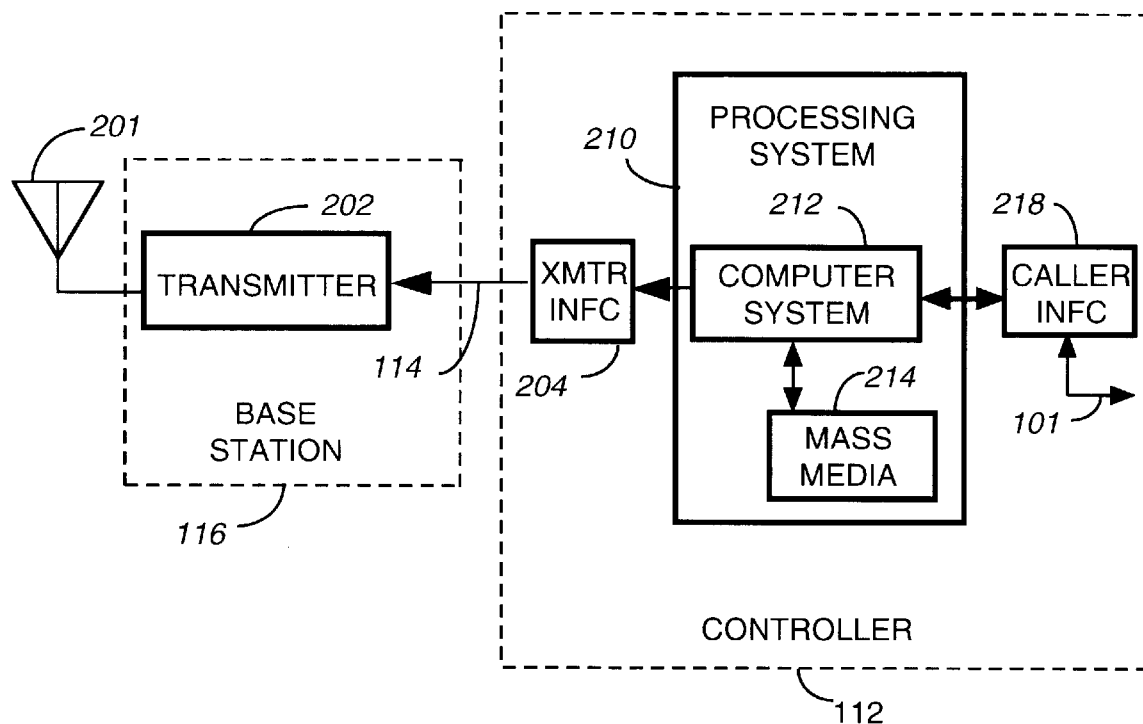
FIGS. 2 and 3 are electrical block diagrams of the radio communication system and the SCR (selective call radio) of FIG. 1, respectively.
Figure 3:
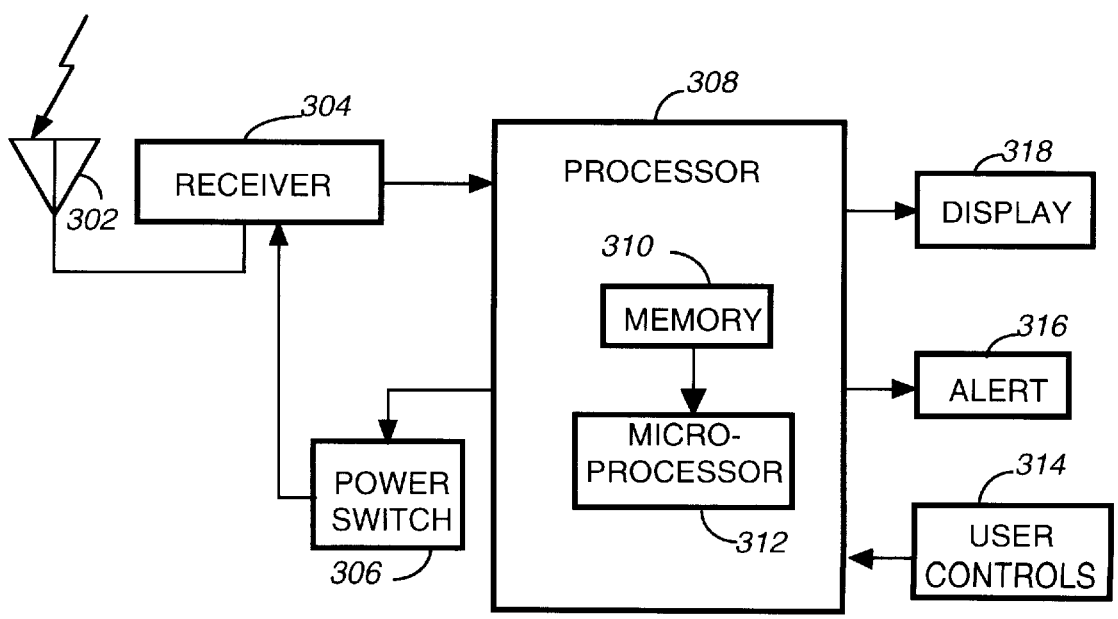

FIGS. 2 and 3 are electrical block diagrams of the radio communication system 102 and the SCR 122 of FIG. 1, respectively. The electrical block diagram of the radio communication system 102 includes the elements of the controller 112 and the base stations 116. The controller 112 comprises a conventional processing system 210 for controlling operation of the base stations 116, a conventional caller interface 218 for receiving messages from the PSTN 110, and a conventional transmitter interface 204 for communicating messages to the base stations 116. The processing system 210 includes conventional hardware such as a computer system 212 and mass media 214 to perform the programmed operations of the controller 112. The base stations 116 comprise a conventional RF transmitter 202 coupled to an antenna 201 for transmitting the messages received from the controller 112.

The SCR 122 comprises an antenna 302 for intercepting RF signals from the radio communication system 102. The antenna 302 is coupled to a receiver 304 employing conventional demodulation techniques for receiving the communication signals transmitted by the radio communication system. Radio signals received by the receiver 304 produce demodulated information, which is coupled to a processor 308 for processing received messages. A conventional power switch 306, coupled to the processor 308, is used to control the supply of power to the receiver 304 from a conventional battery source, thereby providing a battery saving function.

To perform the necessary functions of the SCR 122, the processor 308 includes a microprocessor 312, and a memory 310 including, for example, a random access memory (RAM), a read-only memory (ROM), and an electrically erasable programmable read-only memory (EEPROM). The processor 308 is programmed by way of the ROM to process incoming messages transmitted by the radio communication system 102. The processor 308 decodes an address in the demodulated data of the received message, compares the decoded address with one or more addresses assigned and stored in the EEPROM of the SCR 122, and when a match is detected, proceeds to process the remaining portion of the message if predetermined expectation criteria is satisfied, as will be described below.

Assuming the processor 308 decides to process the message, it stores the message in the RAM, and a call alerting signal is generated to alert a user that a message has been received. The call alerting signal is directed to a conventional audible or tactile alerting device 316 for generating an audible or tactile call alerting signal. The message can be accessed by the user through user controls 314, which provide functions such as lock, unlock, delete, read, etc. More specifically, by the use of appropriate functions provided by the user controls 314, the message is recovered from the RAM, and conveyed to the user by way of a display 318 (e.g., a conventional liquid crystal display—LCD). It will be appreciated that, alternatively, the display 318 can be accompanied with an audio circuit (not shown) for conveying, for example, audio-visual voice messages.

Preferably, the communication system 100 employs one of the Flex™, family of protocols, developed by Motorola, Inc. (Flex™ is a trademark of Motorola, Inc.), for transmitting messages to the SCRs 122. The Flex™ protocol is a digital selective call signaling protocol that is presently used by various system operators in the United States and in several other countries. It will be appreciated that, alternatively, other digital signaling protocols may be used that are suitable with the present invention.

Figure 4:
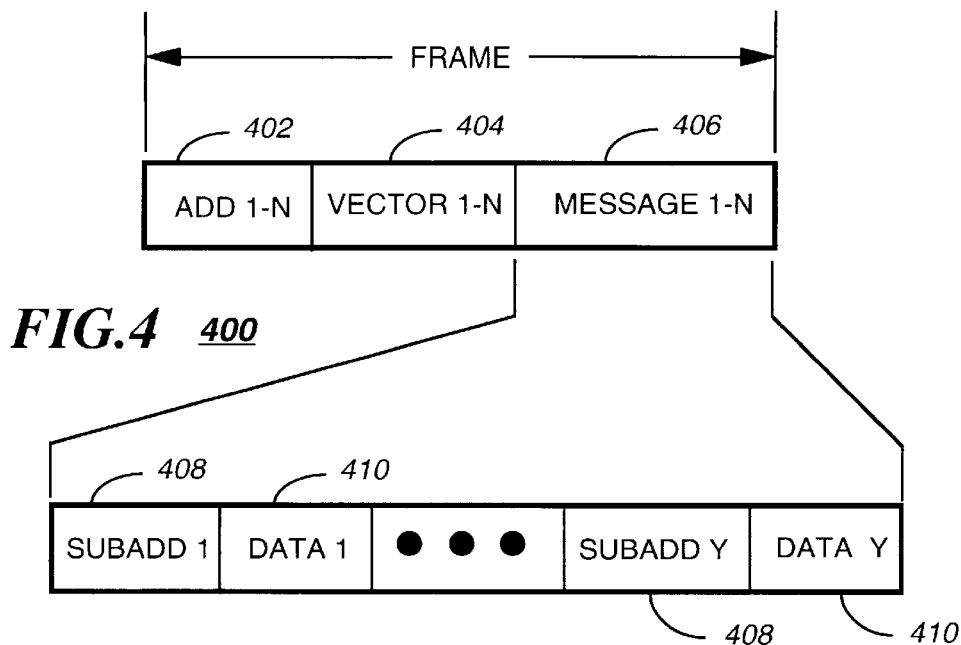
FIG. 4 depicts the format of the communication protocol of the communication system of FIG. 1 utilized by the present invention.

FIG. 4 depicts by way of example the general format of the Flex™, communication protocol 400. As this diagram illustrates, a Flex™ frame of data comprises an address field 402 including by way of example N addresses, a vector field 404 of N corresponding vectors, and a message field 406 of N corresponding messages. Each address identifies one or more SCRs 122 intended to receive a corresponding message. Each vector serves to direct the SCR 122 to a corresponding message associated with an address. Optionally, each of the N messages may be subdivided into one or more sub-messages, each sub-message comprising a subaddress field 408 followed by a corresponding data field 410.

Figure 5:
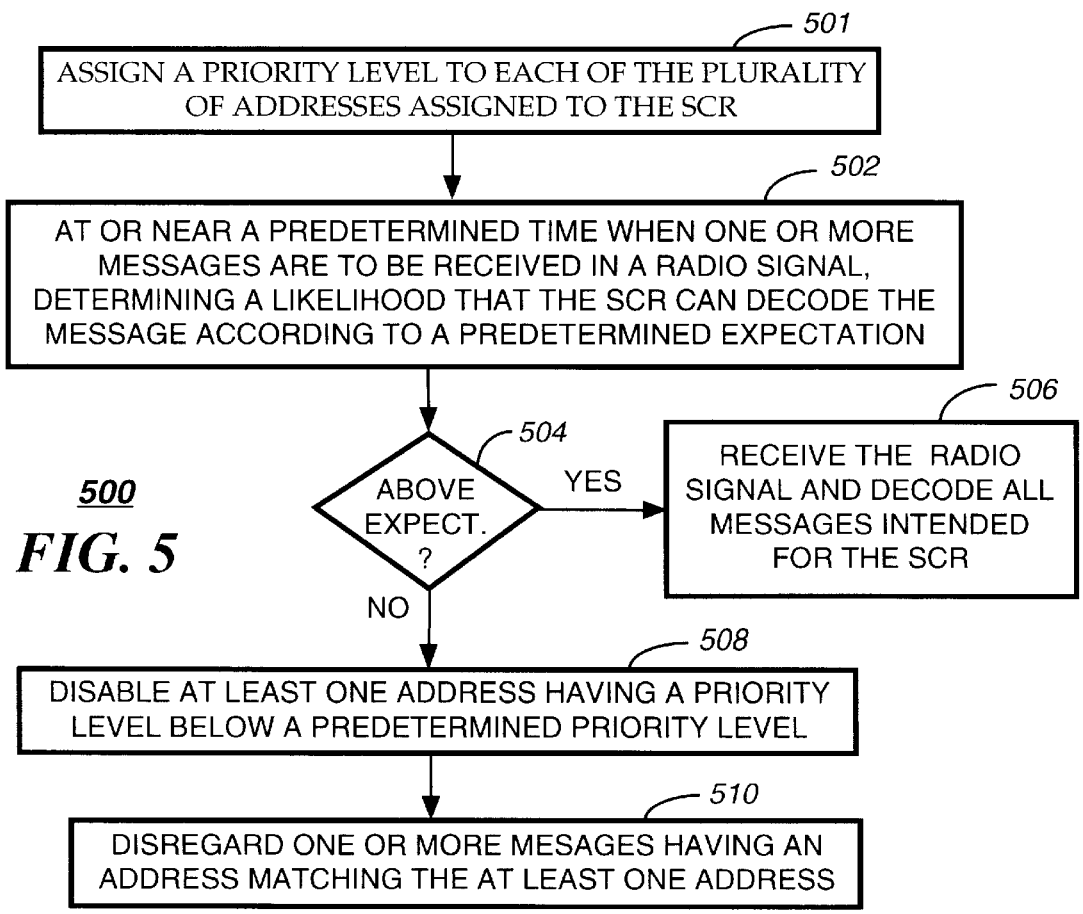
FIG. 5 depicts a flowchart summarizing the operation of the communication system of FIG. 1 according to the present invention.

Based on this format, the SCR 122 is programmed to selectively decode messages according to any number of prioritization schemes consistent with the present invention. The operation of the SCR 122 is illustrated by flowchart 500 shown in FIG. 5 in accordance with the present invention. Flowchart 500 depicts the programmed steps of the SCR 122, which are preferably stored in the memory 310 of the processor 308. The flowchart 500 begins with step 501 where the processor 308 is programmed to assign a priority level to each of the plurality of addresses assigned to the SCR 122. As noted in FIG. 4, the SCR 122 may be assigned to more than one address. For example, the SCR 122 may be assigned to D several addresses some of which arrive in part in the address field 402, and some of which arrive as subaddresses 408 in the message field 406. Each of these addresses is assigned a priority level according any number of embodiments appropriate for the present invention.

In one embodiment, for example, the priority level for each address is assigned by the user of the SCR 122. Under this embodiment, the user selects a priority level according to a prioritization scheme chosen by the user. In one prioritization scheme, for instance, a user may choose to assign a high priority level to caller initiated messages, and a low priority level to message information services such as advertisement, and news.

Alternatively, the radio communication system 100 can be designed to remotely make assignments of priority levels in the SCR 122. This is accomplished by transmitting a radio message to each SCR 122 dictating the priority level for each address. Under this embodiment the service provider controls prioritization according to the services that the user has subscribed to. For users who receive free services subsidized by advertisement sponsors, the service provider may choose to set a priority level higher for advertisement messages than all other messages. For end users who are paid subscribers, however, the service provider may choose to set a higher priority on caller initiated messages than information message services.

Once the priority level for each address has been assigned, the processor 308 proceeds to step 502. In this step, at or near a predetermined time when a message 406 with a corresponding address 402 is to be received in a radio signal, the processor 308 determines a likelihood that the SCR 122 can decode the message according to a predetermined expectation. Based on the Flex™ communication protocol, the predetermined time preferably corresponds to the periodicity that the SCR 122 is programmed to seek detection of incoming messages. This periodicity is generally referred to in common parlance as the collapse time of the SCR 122.

In step 504, when the likelihood of decoding the message 406 is equal to or above the predetermined expectation, the processor 308 proceeds to step 506 where it receives the radio signal and decodes all messages intended for the SCR 122. Alternatively, when the likelihood of decoding the message 406 is below the predetermined expectation, the processor 308, in step 508, disables at least one address assigned to the SCR 122 having a priority level below a predetermined priority level. Upon disabling the at least one address, the processor 308 proceeds to step 510 where it disregards one or more messages in the radio signal having an address matching the at least one address that was disabled.

As noted above, the SCR 122 operates from a battery source. Preferably, the predetermined expectation comprises an objective to operate the SCR 122 from the battery source above a predetermined energy level. When the objective is not satisfied, the processor 308 is programmed to proceed with step 508, which causes at least one address to be disabled. The predetermined energy level is preferably a low-battery condition corresponding to an energy level of the battery known to prevent the SCR 122 from receiving, for example, excessively long messages. To avoid this situation, each address of the SCR 122 is carefully assigned a priority level with the intent of increasing the likelihood that the SCR 122 can receive a message during a low-battery condition.

Thus, to screen out long messages, addresses assigned to such messages are given a low priority level. In contrast, addresses corresponding to short messages are given a high priority level. Accordingly, the predetermined priority level is selected to disable reception of messages with a low priority level, which in this example represents the step of disabling reception of long messages during a low-battery condition. As a result of enabling only addresses associated with short messages, the likelihood that an SCR 122 will properly receive such messages under a low-battery condition is significantly higher than would be the case for long messages.

Reinstatement of the disabled addresses occurs when the processor 308 detects that the SCR 122 has been coupled to an external power source operating above the predetermined energy level. When this occurs, the processor 308 re-enables all addresses previously disabled in step 508. The detection process may be as a result of an end user of the SCR 122 replacing a worn-out battery with a fresh battery, or as a result of the end user placing a SCR 122 having a rechargeable battery in a charging unit.

In yet an alternative embodiment, the predetermined expectation comprises an objective to receive messages when the SCR 122 detects a RF (radio frequency) sensitivity level above a predetermined BER (bit error rate). When the objective is not satisfied, that is, when the SCR 122 measures an RF sensitivity below the predetermined BER, the processor 308 is programmed to proceed with step 508 as described above. It is well known that when the BER is low, this condition correlates to a low probability that long messages will be received properly. In fact under a low BER condition, in some instances, long messages will be received with so many errors that the errors in the message are beyond the repair capability of a conventional error correction algorithm used by the SCR 122. The same is not true for short messages, however. A common error correction algorithm used by the Flex™ family of protocols is the Bose, Chaudhuri, Hocquernghem (BCH) error correction algorithm which can correct up to 2 bit errors per 32 bits of a code word in a Flex™ frame.

A simple example will help to illustrate this point. Assume, for example, that the SCR 122 remotely measures a BER equal to 1 bit error per every 100 bits of data received from the radio communication system 100. Under these conditions, a 100 bit message (short message) will have no more than 1 errored bit. A 10,000 bit message, on the other hand, will have at least 100 errored bits. The BCH algorithm will clearly be able to correct a single bit error in a short message. However, depending on the location of the bit errors, a 10,000 bit message with 100 bit errors may be corrupt beyond the repair capability of the BCH algorithm.

Accordingly, a service provider will select a BER threshold as part of the predetermined expectation criteria that is consistent with customer expectations of the performance of the SCR 122. Additionally, the priority level of each address will be assigned (according to either of the embodiments discussed above) based on the type of messages services assigned to each address.

As mentioned earlier, the SCR 122 may be assigned to a plurality of addresses, some which are received in the address field 402 and some of which arrive as subaddresses 408 in the message field 406. Preferably, these addresses are ordered hierarchically. For example, assume that an end user of an SCR 122 is subscribed to news information services, advertisement services, and caller initiated messaging services. Each of these services in turn comprises sub-topics. For example, news information services comprises weather, stock information, international news, national news and local news sub-topics. Advertisement services includes retail, and service advertisements as sub-topics. And caller initiated messaging services includes personal messages, and work-related messages as subtopics. Based on this structure, each category is preferably assigned an address that is transmitted in the address field 402, and each sub-topic is assigned a subaddress 408.

Each of these categories and respective sub-topics is ordered hierarchically according to its address, and associated priority level. A user or the service provider can program the SCR 122 to disregard messages according to the corresponding hierarchical and priority level of each address. For example, a SCR 122 under a low-battery condition may be programmed to receive stock information, no advertisements, and all caller initiated messages. Such a selection represents the enabling of the address assigned to news services and the subaddress assigned to stock information. The subaddresses for the sub-topics of weather, international news, national news and local news would be disabled. In the case of advertisement services, the address for advertisement services would be disabled, which in turn disables all sub-topics associated therewith. Lastly, the address for caller messaging services would be enabled along with the subadresses of its corresponding subcategories, i.e., personal messages, and work-related messaging.

This example illustrates a scenario where only those message services that generate brief messages are enabled. Accordingly, the likelihood that the SCR 122 can receive such messages is high—for the reasons stated above. The process of selecting messages according to its hierarchical and priority level may also be influenced by the expected content of the messages. That is, an end user may choose to assign personal messages a higher priority level than work-related messages.

As should be evident from the foregoing discussions, the present invention is substantially advantages over the prior art. Particularly, the present invention provides a method and apparatus for selectively decoding prioritized messages. Consequently, the present invention improves the likelihood that a SCR 122 can decode a message properly when the SCR 122 is not operating under optimal conditions, e.g., low-battery, or under a high BER condition.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a SCR (Selective Call Radio) assigned to a receiver having a plurality of addresses for storing messages with different message content in each of the plurality of addresses, a method comprising the steps of:

assigning a priority level to each of the plurality of addresses based on the message content of the messages received at each of the plurality of addresses;

at or near a predetermined time when a message with a corresponding address is to be received in a radio signal, determining a likelihood that the SCR can decode the message according to a predetermined expectation;

when the likelihood of decoding the message is below the predetermined expectation, disabling at least one address assigned to the SCR having a priority level below a predetermined priority level; and disregarding one or more messages in the radio signal having an address matching the at least one address that was disabled.

2. The method as recited in claim 1, wherein the SCR operates from a battery source, and wherein the predetermined expectation comprises an objective to operate the SCR from the battery source above a predetermined energy level, and to disable the at least one address when the objective is not satisfied.

3. The method as recited in claim 2, further comprising the steps of:

detecting that the SCR is coupled to an external power source operating above the predetermined energy level; and re-enabling the at least one address to receive one or more messages each having an address that matches the at least one address.

4. The method as recited in claim 1, wherein the predetermined expectation comprises an objective to receive messages when the SCR detects a RF (radio frequency) sensitivity level above a predetermined BER (bit error rate), and to disable the at least one address when the objective is not satisfied.

5. The method as recited in claim 1, wherein the plurality of addresses assigned to the SCR are ordered hierarchically, and wherein the disabling step comprises the step of disabling at least one address from the plurality of addresses according to the priority level and hierarchical level of each address.

6. The method as recited in claim 1, wherein the step of assigning the priority level to each of the plurality of addresses is performed by a user of the SCR.

7. The method as recited in claim 1, wherein the step of assigning the priority level to each of the plurality of addresses is performed by a radio communication system that transmits a message to the SCR dictating the priority level for each address.

8. The method as recited in claim 1, wherein the disabling step comprises the step of disabling at least one address from the plurality of addresses according to the priority level and the message content size of messages associated with each address without transmitting a signal to a communication system where the SCR is operating.

9. A SCR (Selective Call Radio) assigned to a plurality of addresses for storing messages with different message content in each of the plurality of addresses, comprising:

a receiver; and a processor coupled to the receiver, wherein the processor is adapted to:

assign a priority level to each of the plurality of addresses within the receiver based on the message content of the messages received at each of the plurality of addresses;

at or near a predetermined time when a message with a corresponding address is to be received in a radio signal, determine a likelihood that the SCR can decode the message according to a predetermined expectation;

when the likelihood of decoding the message is below the predetermined expectation, disable at least one address assigned to the SCR having a priority level below a predetermined priority level;

enable the receiver to receive the radio signal; and disregard one or more messages in the radio signal having an address matching the at least one address that was disabled.

* * * * *